May 20, 1941.  S. BOGATY  2,242,998
ROTARY FEED FOR STOCK DRIERS
Filed Oct. 9, 1939  2 Sheets-Sheet 2

Inventor:-
Stanislaus Bogaty
by his Attorneys
Howson & Howson

Patented May 20, 1941

2,242,998

UNITED STATES PATENT OFFICE 2,242,998

ROTARY FEED FOR STOCK DRIERS

Stanislaus Bogaty, Philadelphia, Pa., assignor to Proctor & Schwartz, Incorporated, Philadelphia, Pa., a corporation of Pennsylvania Application October 9, 1939, Serial No. 298,697

2 Claims. (Cl. 19—67)

This invention relates to rotary feeds for fibrous stock, such as cotton, wool and other vegetable and animal fibres, rayon and other synthetic filaments of lengths approximating those of animal or vegetables fibres.

Rotary stock feeders for driers or other apparatus designed to receive the stock for treatment, include a cylinder or drum which is mounted for rotary movement between two plates disposed adjacent the opposite ends respectively of the drum and which form the sides of the hopper into which the stock is placed and spread in an even layer on the face of the drum. The drum is usually fixed to a shaft which extends through the side plates of the hopper and mounted in bearings located outside the walls of the hopper. The stock is fed toward the face of the drum, within the hopper, by a suitable apron or conveyer and the drum is provided on its peripheral face with outwardly projecting spikes which pick up the stock and carry it in an uneven layer upwardly to an oscillating comb, rotary beater, kicker or any other suitable stock evener which is mounted in the upper portion of the hopper. The stock evener removes surplus stock from the face of the drum and returns it to the body of stock on the apron in the lower portion of the hopper, leaving a layer of stock on the drum of substantially uniform thickness. This is subsequently removed from the face of the feeder drum by a rotary beater consisting of a cylinder, of relatively smaller diameter than the feed drum, which is provided with radial circumferentially spaced axially extending blades. These blades wipe the stock off the spikes on the face of the feeder drum onto the receiving end of a conveyer which transports the stock through the drier or other treating apparatus. The device for removing the stock from the spiked apron is not necessarily limited to the construction just described. It may be any suitable form of rotary or oscillating blade.

The ends of the beater cylinder and the ends of the feed drum normally lie in closely spaced relation to the side walls of the hopper. Heretofore, with a view toward preventing stock from getting into the spaces between the ends of the feeder drum and beater cylinder and the side walls of the hopper, guards have been provided on the side walls of the hopper to project axially inwardly around the ends of these two cylindrical elements. While these guards prevent large quantities of stock from getting down between the ends of the two cylindrical elements and the side walls of the hopper, relatively small quantities do find entrance into such spaces. These small quantities accumulate in the spaces between the ends of the two cylinders and the side walls of the hopper and around the supporting shafts for the cylinders, where these shafts pass through the walls of the hopper. These accumulations eventually result in jamming of the feed, with the fibres in some instances becoming so solidly packed that breakage of parts of the apparatus occurs. To prevent this, constant attention and frequent cleaning out of the accumulated fibre is necessary. This results in loss of production during the periods while the feeder and associated apparatus remain idle during the removal of the accumulated fibre.

The object of the present invention is to construct a rotary stock feeder in such a manner that accumulation of the stock between the ends of the feed drum or beater and the walls of the hopper cannot take place, as will be fully disclosed hereinafter, reference being had to the accompanying drawings, of which:

Figure 1:
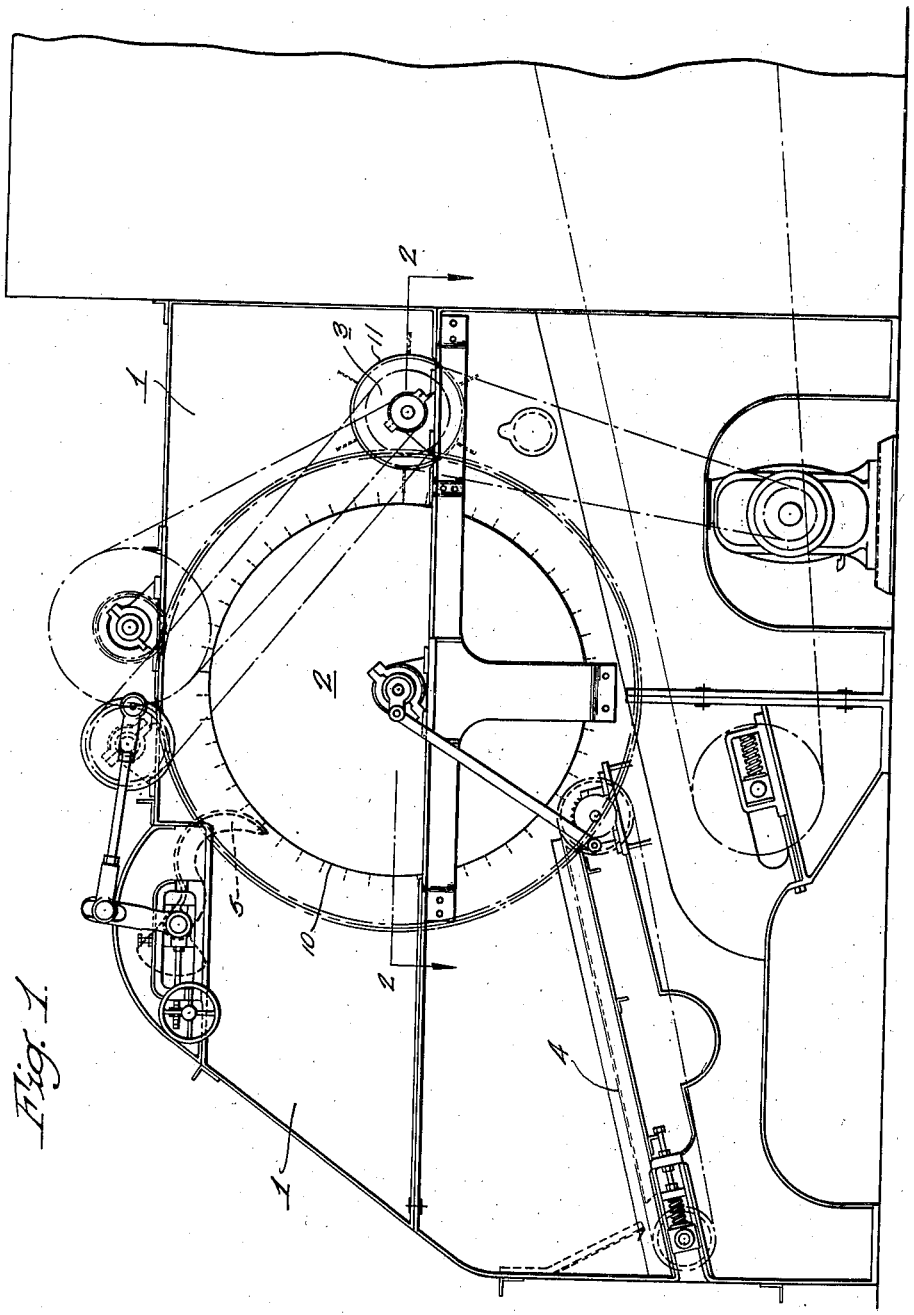
Fig. 1 is an end or side view of a rotary stock feed embodying the distinguishing characteristics of the present invention.
Figure 2:
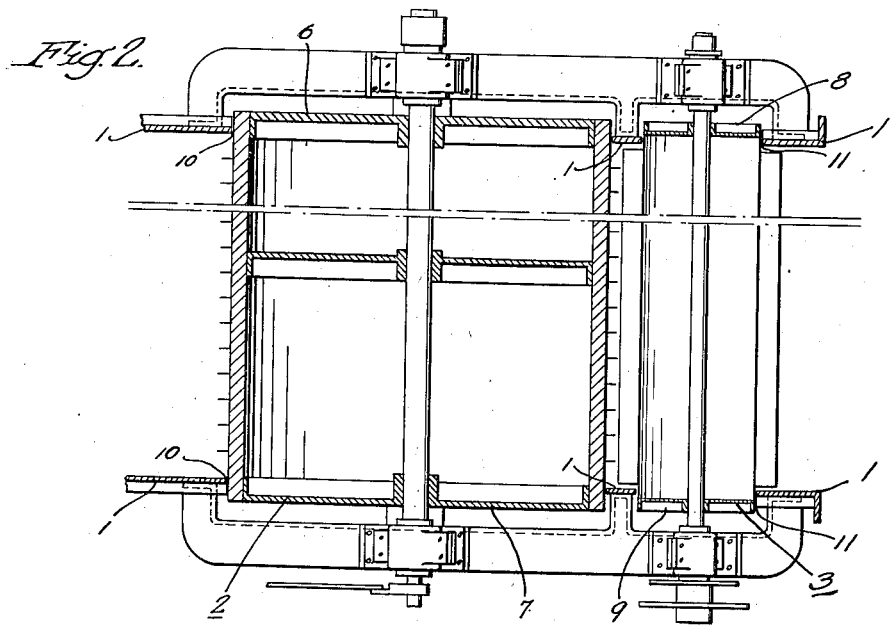
Fig. 2 is a sectional plan view taken on the line 2—2, Fig. 1.

As shown in Figs. 1 and 2, the side frames of the feeder are indicated at 1, 1 respectively The feed drum or cylinder is shown at 2, the beater drum or cylinder at 3, the feed apron at 4, and the oscillating comb at 5. As the general construction and operation of these elements are well known to those familiar with the art no further description or explanation relative thereto is deemed necessary.

In order to prevent accumulation of fibre, in the manner above described, the opposite ends 6 and 7 of the feed cylinder 2, and the corresponding ends 8 and 9 of the beater cylinder 3 project through openings 10 and 11 respectively, which are formed in the side walls 1, 1 of the hopper. The ends of the cylinders 2 and 3, as shown in Fig. 2, extend a substantial distance beyond the outside surfaces of the end walls 1, 1.

The side or end walls 1, 1 of the hopper, at and adjacent the cylinder receiving openings 10 and 11, are relatively thin, in order to reduce the inner surfaces of the cylinder receiving openings 10 and 11 to a minimum, whereby the possibility of stock jamming between the outer peripheral faces of the cylinders 2 and 3 and the inner surfaces of the openings 10 and 11 is reduced to a minimum.

The diameters of the openings 10 and 11 are but slightly larger than the outside diameters of the cylinders 2 and 3, to reduce the passage of stock therebetween to a minimum; but any stock which may work out between the closely adjacent surfaces of the cylinders and the openings in the side walls 1, 1, through which the ends of the cylinders project, will fall free, outside the feeder, where the stock cannot accumulate between inaccessible relatively moving parts of the machine, and where such droppings can be readily removed without stopping the machine.

Figure 3:
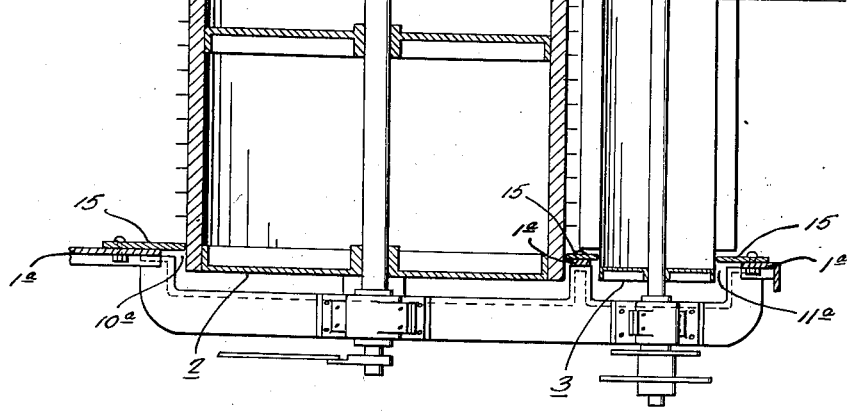
Fig. 3 is a view similar to Fig. 2 and showing a modification within the scope of the invention.

If desired, the cylinder openings 10ª and 11ª in the walls 1ª, 1ª, of the hopper (see Fig. 3), may be substantially larger than the cylinders 2 and 3, and a close fitting ring or plate 15 of thin sheet metal may be placed on the cylinders adjacent the ends thereof and secured to the inner faces, preferably, of the side walls of the hopper, whereby the side walls of the hopper around the ends of cylinders may be made of substantial thickness and reinforced circumferentially of the openings, if desired, while keeping the cylinder contacting or near-contacting edge of the ring 15 at minimum thickness to prevent jamming of stock therebetween.

Having disclosed the application of the present invention to the two main places at which escaping stock normally gives trouble, it will be obvious that the invention may be applied in the same general manner to any other places in the feeder, or in other stock handling devices, where such annoyances occur.

I claim:

1. A rotary feeder for fibrous stock comprising a hopper including opposite side walls, a rotary drum of greater length than the distance between said side walls mounted in said hopper with the opposite ends of the drum extending beyond said side walls respectively through openings formed in and completely through said side walls and of slightly greater diameter than the drum, means in said hopper for feeding stock against the peripheral face of the drum, and means in said hopper for finally removing the stock from said drum, said side walls confining the stock on the drum to a predetermined thickness adjacent said side wall openings between said feeding means and said removing means, said extended ends of said drum carrying loose stock escaping through said openings outwardly beyond said side walls of the hopper.

2. A rotary feeder for fibrous stock comprising a hopper including opposite side walls, a rotary drum of greater length than the distance between said side walls mounted in said hopper with the opposite ends of the drum extending beyond said side walls respectively through openings formed in and completely through said side walls and of slightly greater diameter than the drum, means in said hopper for feeding stock against the peripheral face of the drum, and means in said hopper for finally removing the stock from said drum in the form of a rotary beater comprising a cylinder of substantially the same length as said drum and rotatably in the hopper with the opposite ends of the cylinder extending beyond said side walls respectively through openings formed in and passing completely through said side walls and of slightly greater diameter than said cylinder, said side walls confining the stock on the drum to a predetermined thickness adjacent said side wall openings between said feeding means and said removing means, said extended ends of said drum and said cylinder carrying loose stock escaping through said openings outwardly beyond said side walls of the hopper.

STANISLAUS BOGATY.